April 23, 1957   A. H. DEWEES   2,789,628
INSULATING MEMBER FOR UPHOLSTERED STRUCTURES
Filed March 23, 1955

INVENTOR.
ALEXANDER H. DEWEES
BY
ATTORNEYS

# 2,789,628

INSULATING MEMBER FOR UPHOLSTERED STRUCTURES

Alexander H. Dewees, Detroit, Mich.

Application March 23, 1955, Serial No. 496,118

4 Claims. (Cl. 155—181)

This invention relates to upholstered articles wherein relatively soft material and trim material are fabricated over an underlying metallic spring structure. Some examples of such structures are chairs and couches or davenports and the seats of automotive vehicles.

The object of the invention is to provide an improved insulating member, or platform as such members are sometimes called, for disposition between the underlying metallic spring structure and the overlying soft material or padding. One purpose of such as insulator or platform is to prevent the elements of the spring structure from cutting into, embedding into, or abrading and wearing the padding. The invention aims to provide a platform structure of flexible and yielding characteristics so that it may move, bend or flex in accommodation of the flexing of the springs, and which can be produced economically and at low cost. The platform or insulator of this invention is comprised of a fabric capable of withstanding long usage when applied directly against spring structure which shifts and flexes under weight in use, and which is reinforced with tensile elements of plastic material which is also flexible and possesses elastic characteristics.

The invention is disclosed in the accompanying drawings.

Figure 1:
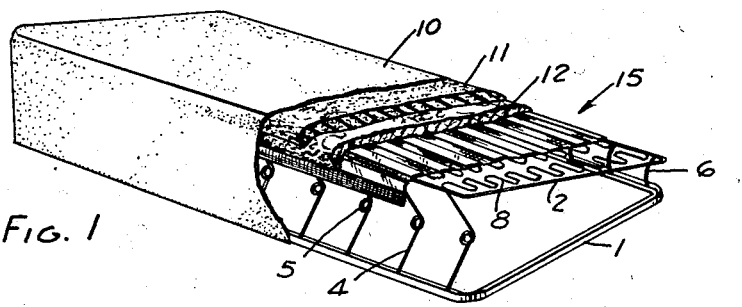
Fig. 1 is a view with parts cut away and parts in section illustrating the construction of a seat, such as may be used in an automotive vehicle.

It is not deemed necessary to specifically show and describe herein a large variety of upholstered articles and, accordingly, one upholstered article is shown in Fig. 1 as being in the form of a seat for an automotive vehicle. Of course, the invention is applicable not only to the part of the seat upon which the occupants sit, but applies as well to the seat backs.

The seat structure shown in Fig. 1 may have a lower metallic frame 1 and an upper frame 2. The lower frame supports spring elements 4 which, in turn, support the upper frame 2. The spring elements 4 are shown as in the form of length of elastic steel wire each with a coil 5, these being disposed at the front of the seat. Other spring wire elements 6 are disposed at the back of the seat. Extending across the frame 2 in proper spaced relationship, are yielding spring wire elements of the so-called zig-zag or serpentine form, as illustrated at 8. Suffice it to say that this provides a yielding structure with the zig-zag wires 8 flexing under load and the spring elements 4 and 6 also flexing under load to provide a soft yielding support.

The material placed over this underlying spring structure is shown herein as being constituted by the outermost trim material 10, underneath which may be a layer 11 of foam rubber or other similar material, and under the layer 11 is a layer of padding material 12 which may be cotton padding. Between the cotton padding 12 and the underlying spring structure is the platform or insulator generally indicated at 15.

Figure 2:
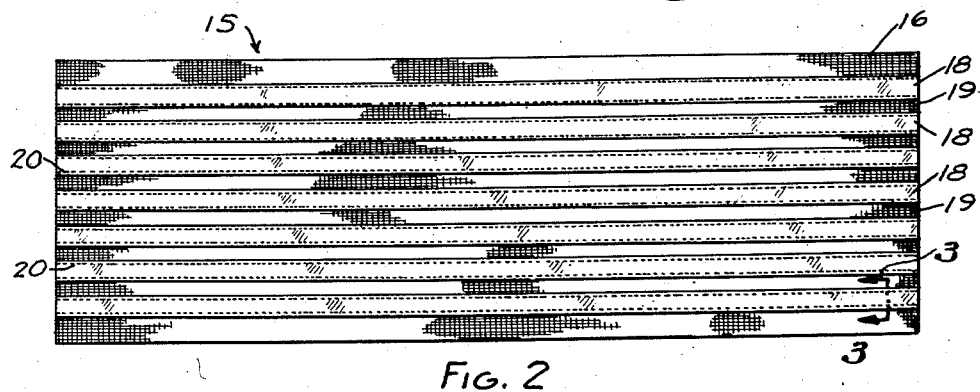
Fig. 2 is a plan view of a length of insulating material.
Figure 3:
Fig. 3 is an enlarged cross sectional view taken substantially on line 3—3 of Fig. 2 showing the reinforcing member secured to the fabric.

This insulator or platform, shown in Figs. 2 and 3, comprises a sheet of fabric 16 advantageously cut to the proper shape and size for the particular spring involved. This fabric is preferably a woven textile material, such as burlap, or a suitable grade of canvas although the invention is not limited to any particular fabric. It is feasible that the fabric may be one which is felted, woven or otherwise interlaced.

The fabric is reinforced by a plurality of plastic tensile elements 18 preferably extending lengthwise of the fabric, as shown in Fig. 1. The term "lengthwise" is used in the sense that the reinforcing strips extend in the direction of the longer dimension of the underlying spring structure which actually would be crosswise insofar as the seat of an automobile is concerned, that is, crosswise of the automobile body.

The plastic reinforcing elements 18 are preferably of strip or ribbon form and may be of one of the copolymers of vinylidene chloride and vinyl chloride. Any other suitable flexible and/or elastic plastic may be used. The thickness of the strip of reinforcing, as shown in Fig. 3, is exaggerated for clearness. As shown in Fig. 3, the several strips are spaced from each other and are substantially parallel with intervening spaces 19, and one manner of securing the strips to the fabric is that of stitching or sewing. This is indicated by the stitches 20.

Figure 4:
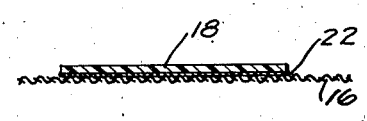
Fig. 4 is a view similar to Fig. 3 showing a modified form of the invention.
Figure 5:
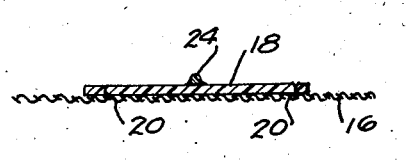
Fig. 5 is a cross sectional view similar to Fig. 3 showing a still further modified form.

In the form shown in Fig. 4, the plastic strip 18 may be secured to the fabric by a suitable adhesive 22. In the form shown in Fig. 5 the ribbon form reinforcing strip may be further strengthened by means of a plastic yarn 24 which may run lengthwise of the strip and may be adhered thereto by a suitable adhesive or secured or welded thereto by the application of heat and pressure. A so-called yarn suitable for this purpose is known as Saran. In Fig. 5, the strip 18 is shown as being stitched to the fabric as at 20 but, of course, the strip reinforced by yarn may be applied to the fabric by adhesive as shown in Fig. 4.

Figure 6:
Fig. 6 is a view illustrating the insulating layer secured to a body of padding.

In applying the platform to the spring structure, various arrangements may be employed as befits the particular situation or article. For example, the ends of the platform may be tied down to the base 1. On the other hand, the platform may be stitched to the underside of the padding 12, as shown in Fig. 6.

In use, the platform provides an insulating layer between the underlying spring structure and the overlying padding and thus protects the padding from the spaced spring elements of the underlying spring structure. As the spring structure flexes in use, incident to load, the platform flexes with the spring structure and accommodates the movements thereof, so to speak. For instance, a person may sit on one part of the seat structure and thereby depress it while the remaining part of the seat structure is not flexed or depressed, and the flexibility and elasticity of the platform permits this flexing and offers substantially no resistance thereto. The plastic reinforcing ribbons or strips are flexible and have a measure of elasticity so as to be capable of stretching with the fabric as the fabric is subjected to stretching forces incident to the loads thereon and, of course, to return to normal condition when such loads and stretching forces are released.

It will be noted that there are no metallic parts which may come into engagement with the elements of the spring structure and the entire contact with the spring structure is the fabric reinforced by the plastic strips. The drawings show the plastic strips on the upper side of the fabric sheet and thus out of contact of the underlying spring structure. However, the plastic strips, themselves, are capable of use directly against the elements of the spring structure and, accordingly, the platform may be reversed with the plastic strips against the spring structure and the fabric sheet uppermost and in direct contact with the overlying padding.

The material may be supplied to a manufacturer in rolls and may be cut to the shape of the spring structure with which it is to be used at the time of insulation. Some spring structures are not rectangular in overall form, may be wider in one place than another as, for example, the rear seat of a passenger car where the rear portion of the seat, measured crosswise of the car, has a lesser dimension than its front portion in order to accommodate the wheel housings. The platform material may be readily cut to the shape of such structures.

I claim:

1. A platform structure for disposition between the underlying metallic spring structure and the overlying padding of an upholstered article, such as a seat, to protect the padding from the spring structure comprising, a sheet of fabric material of such dimensions as to cover the underlying spring structure, a plurality of reinforcing strips of elastic plastic material and of ribbon form extending substantially from one edge of the sheet of fabric to the opposite edge thereof, said reinforcing strips having relatively higher tensile strength than said sheet, each of said strips having a portion fixedly secured to the fabric material throughout its length so that said strips are disposed in spaced substantially parallel relationship, each of said strips having other portions in exposed position.

2. A platform structure for disposition between the underlying metallic spring structure and the overlying padding of an upholstered article, such as a seat, to protect the padding from the spring structure comprising, a sheet of woven fabric material of such dimensions as to cover the underlying spring structure and a plurality of reinforcing strips of elastic plastic material of ribbon form extending substantially from one edge of the sheet of fabric to the opposite edge thereof, said reinforcing strips having relatively higher tensile strength than said sheet, each of said strips having a portion adhesively secured to the fabric sheet throughout its length so that the strips are disposed in spaced substantially parallel relationship, each of said strips having other portions in exposed position.

3. A platform structure for disposition between the underlying metallic spring structure and the overlying padding of an upholstered article, such as a seat, to protect the padding from the spring structure comprising, a sheet of fabric material of such dimensions as to cover the underlying spring structure and a plurality of reinforcing strips of elastic plastic material and of ribbon form extending substantially from one edge of the sheet of fabric to the opposite edge thereof, said reinforcing strips having relatively higher tensile strength than said sheet, and a further reinforcing length of plastic yarn superimposed upon and adhered to each strip throughout its length, said strips being fixedly secured to the fabric sheet throughout their length and disposed in spaced substantially parallel relationship, said lengths of yarn and the portions of said strips to which the same are adhered being in exposed position.

4. Platform structure for insulating padding material from an underlying metallic spring structure in upholstered articles such as seats, said platform structure comprising, a sheet of flexible backing material, a plurality of flexible strips having generally flat ribbon form, means securing said strips in interfacial relation to said sheet with said strips in spaced apart, generally parallel relation and with a face of each strip in exposed position, said sheet of backing material having relatively low tensile strength but adequate strength to support said strips in said spaced apart relation, said strips having relatively high tensile strength whereby to provide support for padding material in an upholstered article.

References Cited in the file of this patent

UNITED STATES PATENTS

| | | |
|---|---|---|
| 2,045,317 | Sobie | June 23, 1936 |
| 2,638,154 | Dewees | May 12, 1953 |